US011275155B1

(12) United States Patent
Phillips et al.

(10) Patent No.: US 11,275,155 B1
(45) Date of Patent: Mar. 15, 2022

(54) LASER-ARRAY LIDAR DEVICES (71) Applicant: Lockheed Martin Coherent Technologies, Inc., Louisville, CO (US)

(72) Inventors: Mark W. Phillips, Golden, CO (US); Peter G. Wanninger, Berthoud, CO (US); Samuel Trent Thurman, Broomfield, CO (US); Philip Gatt, Berthoud, CO (US); Carl R. Anderson, Longmont, CO (US)

(73) Assignee: Lockheed Martin Coherent Technologies, Inc., Louisville, CO (US)

( * ) Notice: Subject to any disclaimer, the term of this patent is extended or adjusted under 35 U.S.C. 154(b) by 487 days.

(21) Appl. No.: 15/806,158

(22) Filed: Nov. 7, 2017

Related U.S. Application Data (60) Provisional application No. 62/419,400, filed on Nov. 8, 2016.

(51) Int. Cl.
*G01S 7/481* (2006.01)
*G01S 17/06* (2006.01)

(52) U.S. Cl.
CPC .......... *G01S 7/4816* (2013.01); *G01S 7/4815* (2013.01); *G01S 17/06* (2013.01)

(58) Field of Classification Search
CPC ...... G02B 27/46; G02B 3/0056; G02B 30/27; G02B 5/005; G02B 5/208; H04N 13/218
See application file for complete search history.

(56) References Cited

U.S. PATENT DOCUMENTS

| | | | | |
|---|---|---|---|---|
| 9,086,273 | B1* | 7/2015 | Gruver | G01S 7/4815 |
| 9,134,538 | B1* | 9/2015 | Augst | G02B 27/106 |
| 10,012,732 | B2* | 7/2018 | Eichenholz | G01S 7/4865 |
| 2006/0239312 | A1* | 10/2006 | Kewitsch | H01S 5/42 |
| | | | | 372/29.023 |
| 2007/0181810 | A1* | 8/2007 | Tan | G01S 7/4811 |
| | | | | 250/341.1 |
| 2010/0046953 | A1* | 2/2010 | Shaw | H01S 5/423 |
| | | | | 398/115 |
| 2012/0154783 | A1* | 6/2012 | Goldberg | G01S 7/4812 |
| | | | | 356/4.01 |
| 2015/0034809 | A1* | 2/2015 | Droz | G01J 1/4228 |
| | | | | 250/216 |
| 2016/0282453 | A1* | 9/2016 | Pennecot | G01S 7/4972 |

(Continued)

*Primary Examiner* — Yoqing Xiao
*Assistant Examiner* — Amir J Askarian
(74) *Attorney, Agent, or Firm* — Morgan, Lewis & Bockius LLP (57) ABSTRACT

A LIDAR device includes an array of lasers and an array of corresponding receivers. The spatial distribution of the lasers corresponds to that of the receivers. The array of lasers creates an array of beamlets and correlated receiver fields of view for dense three-dimensional point cloud mapping with precise angular spacing defined by lithographically grown transmitter and receiver arrays. A transmitter lens may be provided that maximizes optical throughput in a coaxial LIDAR by crossing the transmitter beamlets at the focus of the transmitter lens, where a transmit and receive combiner is also located. A single transmitter lens may be used to both collimate and steer the transmitter beamlets to generate a desired spot pattern in angle space. Control circuitry for the lasers may include a drive transistor with a power source coupled to a source terminal and an isolated gate driver coupled to a gate terminal.

17 Claims, 10 Drawing Sheets

(56) References Cited

U.S. PATENT DOCUMENTS

2016/0363669 A1* 12/2016 Liu ..................... G01S 7/4812
2017/0131387 A1*  5/2017 Campbell ............... G01S 17/89
2017/0289524 A1* 10/2017 Pacala ................. G02B 3/0056
2018/0031367 A1*  2/2018 Smith .................... G01S 7/481
2018/0217236 A1*  8/2018 Pacala .................. G01S 7/4816

* cited by examiner

LASER-ARRAY LIDAR DEVICES

CROSS-REFERENCES TO RELATED APPLICATIONS

This application claims priority to and the benefit of U.S. Provisional Patent Application No. 62/419,400, filed Nov. 8, 2016, which is hereby incorporated by reference in its entirety.

STATEMENT REGARDING FEDERALLY SPONSORED RESEARCH OR DEVELOPMENT

Not applicable.

FIELD

The disclosure relates in general to light detection and ranging (LIDAR) devices, and in particular to, for example, without limitation, LIDAR devices having laser transmitting arrays.

BACKGROUND

The description provided in the background section, including without limitation, any problems, features, solutions or information, should not be assumed to be prior art merely because it is mentioned in or associated with the background section. The background section may include information that describes one or more aspects of the subject technology.

LIDAR systems and devices measure distances to objects by emitting laser light onto the objects and detecting reflected portions of the laser light. A laser can be scanned over an object to map the surface of the object. Current LIDAR devices do not create point cloud density data at sufficient rates, ranges, and fill factors to meet many market needs. FLASH imaging LIDAR devices exist that address increased acquisition rates but require expensive transmitter and receiver components that makes them less suitable for many commercial applications.

SUMMARY

In accordance with aspects of the subject disclosure, dense point cloud three-dimensional (3D) LIDAR range finders are provided for mapping and/or for situational awareness applications. A 3D LIDAR range finder may include an array of transmitting lasers and a correspondingly distributed array of receivers and may be provided for scanning and/or mapping operations. LIDAR may sometimes be referred to as LiDAR, lidar, Lidar, light detection and ranging, or light imaging detection and ranging.

In accordance with various aspects of the subject disclosure, a device is provided that includes an array of lasers and an array of corresponding receivers. The device also includes a combiner configured to redirect light that has been generated by the array of lasers and reflected from a target to the array of corresponding receivers. The device also includes a lens interposed between the array of lasers and the combiner.

In accordance with other aspects of the subject disclosure, a device is provided that includes an array of lasers, each configured to generate a beamlet of an angularly continuous beam. The device also includes an array of receivers, each having a field of view corresponding to the beamlet of one of the lasers.

In accordance with other aspects of the subject disclosure, a device is provided that includes an array of lasers, an array of corresponding receivers, and control circuitry. The control circuitry is configured to operate the array of lasers to generate an array of beamlets and to operate the array of corresponding receivers to receive reflected portions of the generated beamlets. The control circuitry includes a driver circuit coupled to a first contact of each of a plurality of the lasers and to a second contact of at least one of the plurality of the lasers. The driver circuit includes a drive transistor. The driver circuit also includes a capacitor coupled between a drain terminal of the drive transistor and the second contact of the at least one of the plurality of the lasers. The driver circuit also includes a power source coupled to a source terminal of the drive transistor. The driver circuit also includes an isolated gate driver coupled to a gate terminal of the drive transistor.

It is to be understood that both the foregoing general description and the following detailed description are exemplary and explanatory and are intended to provide further explanation of the subject technology as claimed. It is also to be understood that other aspects may be utilized and changes may be made without departing from the scope of the subject technology.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

Various challenges can arise when attempting to provide a unity or near-unity fill factor LIDAR device. The subject disclosure provides various features that overcome these challenges and facilitate providing dense point cloud three-dimensional (3D) LIDAR range finders with a unity or near-unity fill factor.

For example, in accordance with various aspects of the subject disclosure, a laser-array LIDAR device is provided that includes an array of beamlets and correlated receiver fields of view that provide a dense 3D point cloud mapping with precise angular spacing. The angular spacing may be defined by lithographically grown transmitter and receiver arrays and/or fiber transmitter and receiver arrays.

As another example, in accordance with various aspects of the subject disclosure, a coaxial laser-array LIDAR device is provided which avoids parallax issues and may increase or optimize optical throughput by crossing transmitter beamlets at the focus of a transmitter lens and providing a transmit-and-receive combiner at this focus location.

As another example, in accordance with various aspects of the subject disclosure, a laser-array LIDAR device is provided that includes a single lens to both collimate and steer the transmitter beamlets to generate a desired spot pattern in angle space (e.g., a spot pattern with a desired center spacing and fill factor).

As another example, in accordance with various aspects of the subject disclosure, a laser-array LIDAR device is provided that overcomes challenges related to electrical inductance in high speed electronic circuits that use high peak current in small scale devices such as lithographic arrays. For example, isolated gate drivers are provided in some implementations to control ground loops and a FET with a separate source for the gate drivers may also be provided. The separate source reduces or minimizes the effect of high current through the source inductance.

Figure 1:
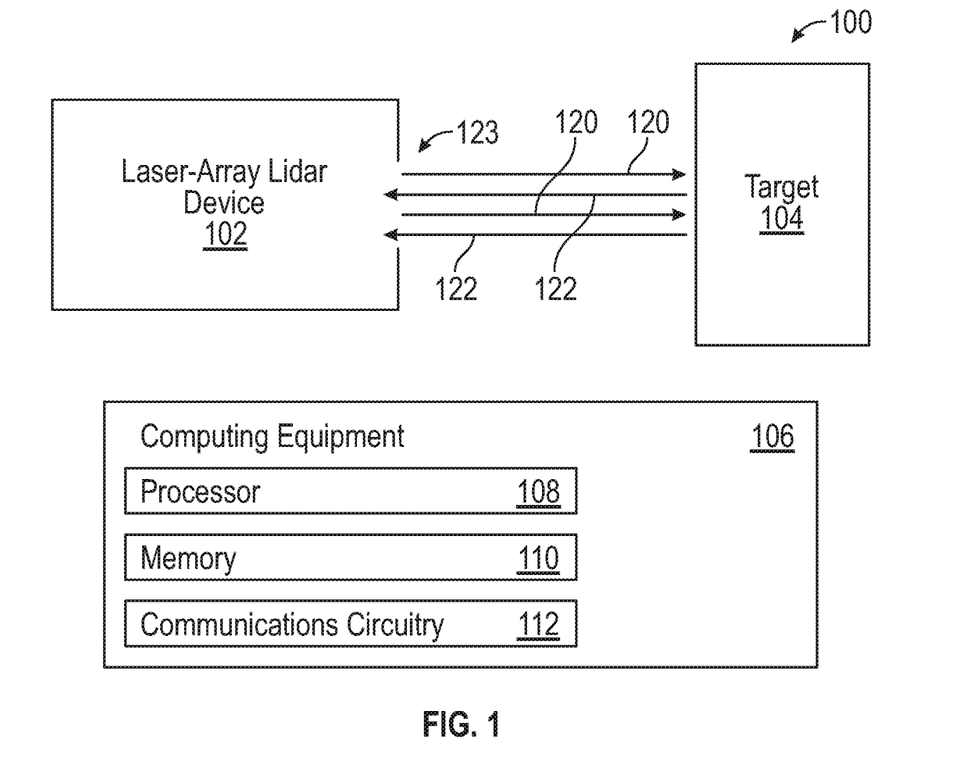
FIG. 1 illustrates a block diagram of a system that includes a laser-array LIDAR device in accordance with certain aspects of the disclosure.

FIG. 1 illustrates a block diagram of an exemplary system having a laser-array LIDAR device. As shown in FIG. 1, system 100 may include laser-array LIDAR device 102 that emits light 120 in the direction of a target such as target 104 and receives reflected light 122 from the target. Laser-array LIDAR device 102 is communicatively coupled to computing equipment 106.

Computing equipment 106 may be separate computing equipment that is coupled to laser-array LIDAR device 102 via a wired or wireless connection or computing equipment 106 may be integrally formed in laser-array LIDAR device 102. Computing equipment 106 operates laser transmitters of device 102 to generate light 120 and receivers of device 102 to receive reflected light 122. Computing equipment 106 may also process signals generated by the receivers to determine a range to one or more portions of target 104 and/or to map one or more surfaces of target 104.

For example, computing equipment 106 includes one or more processors such as processor 108 and non-transitory computer-readable storage such as memory 110. Processor 108 may include one or more microprocessors, multi-core processors, and/or one or more integrated circuits, such as application specific integrated circuits (ASICs) or field programmable gate arrays (FPGAs) that load and execute sequences of instructions, software modules, etc. Processor 108 may execute instructions stored in memory 110. In some implementations, such integrated circuits execute instructions that are stored on the circuit itself.

Memory 110 may include computer-readable media such as RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra-density optical discs, any other optical or magnetic media, and floppy disks. Memory 110 can store sets of instructions/code that are executable by processor 108 including sets of instructions/code that implement the light generation, detection, and processing processes described herein. Examples of computer programs or computer code include machine code, such as is produced by a compiler, and files including higher-level code that are executed by a computer, an electronic component, or a microprocessor using an interpreter.

Communications circuitry 112 may include one or more antennas for wireless communications (e.g., wireless communications at radio, microwave, infrared, or visible wavelengths such as WiFi, Bluetooth, cellular, or other communications signals) with device 102 and/or with external computing equipment (e.g., a host computer, or a remote server). Communications circuitry 112 may include circuitry for sending and/or transmitting signals via external wired connections such as Ethernet or coaxial connections or intra-device connections such as wire-bond, surface mount, and/or conductive via connections to laser transmitters and/or receivers of laser-array LIDAR device 102.

Communications circuitry 112, may include signal processing circuitry such as one or more amplifiers, filters, analog-to-digital (ADC) converters that convert analog signals from receivers of device 102 to digital signals for further processing and/or transmission, digital-to-analog converters (DACs) that convert digital signals for control of transmission of light 120 by laser transmitters of device 102, such as oscillators, mixers, or the like as would be understood by one skilled in the art.

Figure 2:
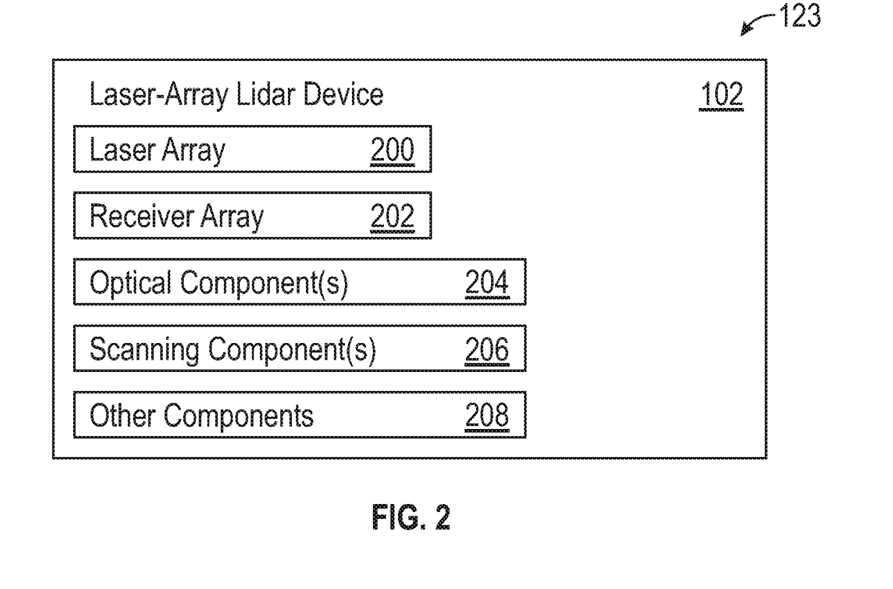
FIG. 2 illustrates a block diagram of a laser-array LIDAR device in accordance with certain aspects of the disclosure.

FIG. 2 illustrates a block diagram of laser-array LIDAR device 102. As shown in FIG. 2, laser-array LIDAR device 102 includes laser array 200 and receiver array 202. Laser array 200 generates light 120. Receiver array 202 has a spatial configuration in which the fields of view of each of the receivers of the array correspond to a beamlet generated by a corresponding transmitter of laser array 200.

Laser array 200 may include two or more vertical-cavity surface-emitting lasers (VCSELs) and/or two or more other lasers such as fiber lasers. Laser array 200 may also, or alternatively, include discrete fiber-coupled edge-emitting lasers and/or micro-lensed diode bars. Laser array 200 may be implemented with, for example, an array of VCSEL transmitters in device 102 for short-range (e.g., less than 200 meters (m)) scanning/mapping. Laser array 200 may be implemented with, for example, an array of fiber lasers in device 102 for long-range (e.g., greater than 200 m) scanning/mapping.

Receiver array 202 may include two or more light detectors such as avalanche photodiode (APD) detectors (e.g., silicon APDs and/or indium gallium arsenide (InGaAs) APDs) that each receive a reflected portion of the light emitted by a corresponding one of the lasers of laser array 200.

Optical components 204 may include diffractive, refractive, and/or reflective elements such as lenses, mirrors, and/or spectral elements that focus and/or steer beamlets from the lasers of laser array 200 through a desired pathway within and out of device 102 to generate light 120. Optical components 204 may also include diffractive, refractive, and/or reflective elements such as lenses, mirrors, and/or spectral elements that focus and/or steer reflected light 122 from outside of device 102 through a desired pathway within device 102 to receivers of receiver array 202.

Other components 208 may include computing equipment such as computing equipment 106 of FIG. 1 (e.g., implemented on one or more printed circuit boards using one or more processors 108 and/or memory 110).

Device 102 may also include one or more scanning components such as scanning components 206. Scanning components 206 may include, for example, an actuable mirror and an associated actuating motor or other actuating mechanism for scanning an array of transmitted beamlets having a near unity fill factor (e.g., a fill factor of greater than 0.5, 0.6, 0.7, 0.8, 0.9, 0.95, or 0.99) over a target such as target 104 during mapping operations. Because of the near unity fill factor, during a single scan across a surface of target 104, computing equipment 106 can generate a real-time map of a full beam width of the scanned surface (e.g., using at least partially overlapping beamlets of an angularly continuous beam).

As noted herein, challenges can arise with respect to optical alignment, parallax, parts-count, cost, optomechanical complexity, manufacturability, reliability, size, weight, and other considerations when attempting to provide a LIDAR device with a near unity fill factor. Various features will now be described that help overcome various ones of these challenges.

The fill factor (e.g., the ratio of illuminated area to unilluminated area within the angular resolution of each beamlet) may be adjusted (e.g., maintained above 0.5, 0.6, 0.7, 0.8, 0.9, 0.95, or 0.99) by adjusting the physical fill factor of the laser transmitters in laser array 200 and/or by providing a microlens array that is matched to the pitch of laser array 200. For example, optical components 204 may optionally include a lithograpically formed microlens array that is lithographically matched to a lithographic laser array 200 such as a lithographic array of VCSELs. The microlens array may be disposed over the laser array such that a beamlet generated by each laser in laser array 200 passes through one of the microlenses in the microlens array creating a new fill factor at the lenslet array.

In one example, each receiver in receiver array 202 is arranged to receive light from a single laser in laser array 200, in a one-to-one arrangement. However, it should also be appreciated that each receiver can be arranged to receive light from multiple lasers in laser array 200 at different times. For example, optical components 204 may direct light that has been generated by more than one of the lasers in laser array 200 (and reflected from a target) to a single receiver in receiver array 202. By operating those lasers that correspond to a single receiver at different times, each receiver in receiver array 202 can be operated to receive light from a single transmitting laser in laser array 200 at any given time and thereby maintain the angular resolution of a single transmitter.

Figure 3:
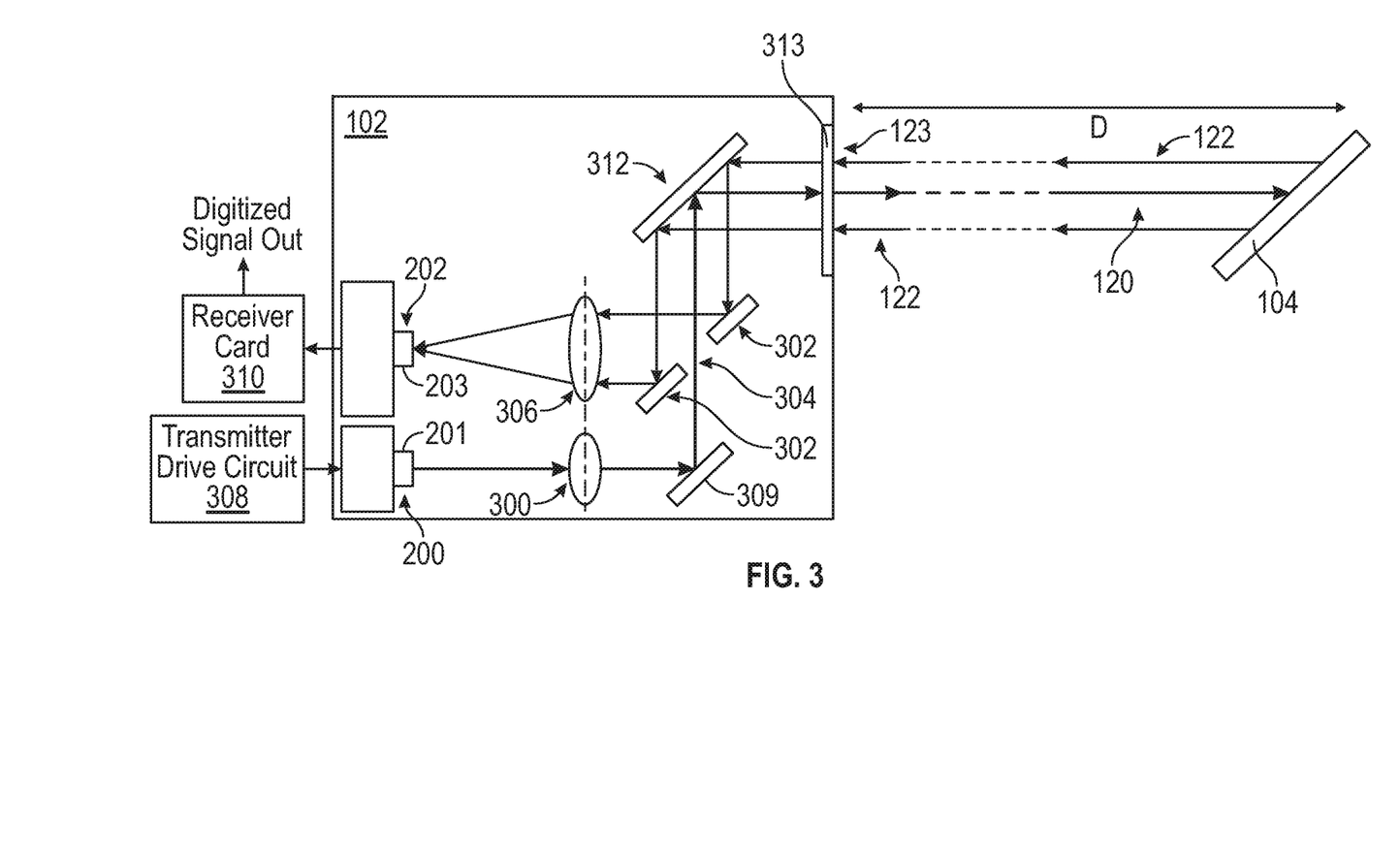
FIG. 3 illustrates a schematic diagram of a laser-array LIDAR device in accordance with certain aspects of the disclosure.

For example, FIG. 3 shows an exemplary arrangement for laser-array LIDAR device 102. In the example of FIG. 3, laser-array LIDAR device 102 includes lens 300 and combiner 302 in the optical path of laser array 200. Combiner 302 includes an opening 304 through which transmitted light 120 from a laser 201 of laser array passes after passing through lens 300. Combiner 302 also includes a mirrored surface that reflects and redirects collimated reflected light 122 through an additional lens 306 to receivers 203 of receiver array 202.

Lens 300 collimates and/or steers the light from lasers 201 of laser array 200 such that collimated beamlets from each laser cross at the location of opening 304. In this way, a coaxial transmit/receive system is provided that maximizes optical throughput and avoids parallax effects that can affect optical systems with parallel transmit/receive paths. Lens 300 may collimate the beamlets from lasers 201 at sufficient size to ensure eye safety in the presence of emitted beams 120.

In the example of FIG. 3, laser-array LIDAR device 102 also includes a scan element 312 (e.g., a reflective or refractive element such as a mirror, a lens, or a liquid crystal element) that guides emitted beams 120 out of window 123 (e.g., through an optically transparent cover 313) and guides reflected light 122 from window 123 to combiner 302. Scan element 312 may be electronically reconfigurable and/or mechanically actuable (e.g., rotatable) to scan beamlets 120 over the surface of target 104 without motion of optical elements 300, 302, and 306 and/or laser array 200 and receiver array 202, if desired.

In the example of FIG. 3, a transmitter drive circuit 308 for controlling laser array 200 and a receiver card 310 (e.g., receiver circuitry) for controlling and receiving signals from receiver array 202 are also shown. Drive circuitry 308 may be formed separately from laser array 200 or may be mechanically coupled to and/or integrated with laser array 200. Receiver card 310 may be formed separately from receiver array 202 or may be mechanically coupled to and/or integrated with receiver array 202.

In the example of FIG. 3, an additional optical element 309 (e.g., a mirror) is provided in the optical path of laser 201 (between lens 300 and combiner 302 in this example) to redirect beamlets from laser array 200 to help provide a compact device in the vertical direction of FIG. 3. However, it should be appreciated that the optical path of lasers 201 can be provided without the bend caused by mirror 309, and mirror 309 can be omitted.

Figure 4:
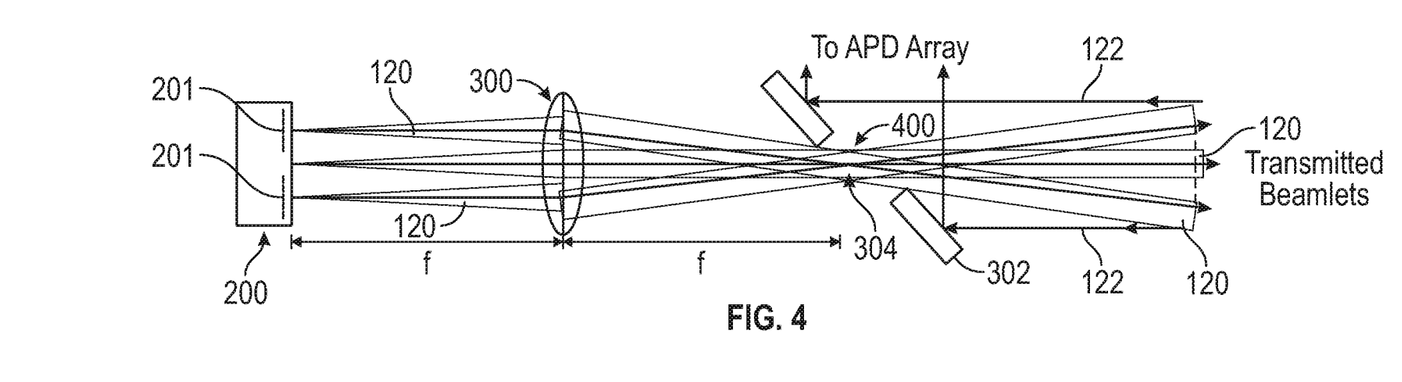
FIG. 4 illustrates a schematic diagram of a portion of a transmitter for a laser-array LIDAR device in accordance with certain aspects of the disclosure.

In the example of FIG. 3, only one laser 201 is shown merely for simplicity. FIG. 4 shows how beamlets from multiple lasers 201 in laser array 200 may be provided and also shows an optical path for lasers 201 without a redirecting mirror 309. As shown in FIG. 4, laser array 200 may be provided with linearly separated lasers 201 (e.g., 64 lasers). Three beamlets 120 from three lasers 201 are shown in FIG. 4 for clarity. As shown, lasers 201 are distributed at one focus (e.g., at a focus distance f) of lens 300. The beamlets 120 angularly expand while traversing the focal length of the lens. Lens 300 then collimates each of the beamlets and redirects (steers) each of the beamlets to cross at a convergence location 400, in the opening 304 of combiner 302.

Figure 5:
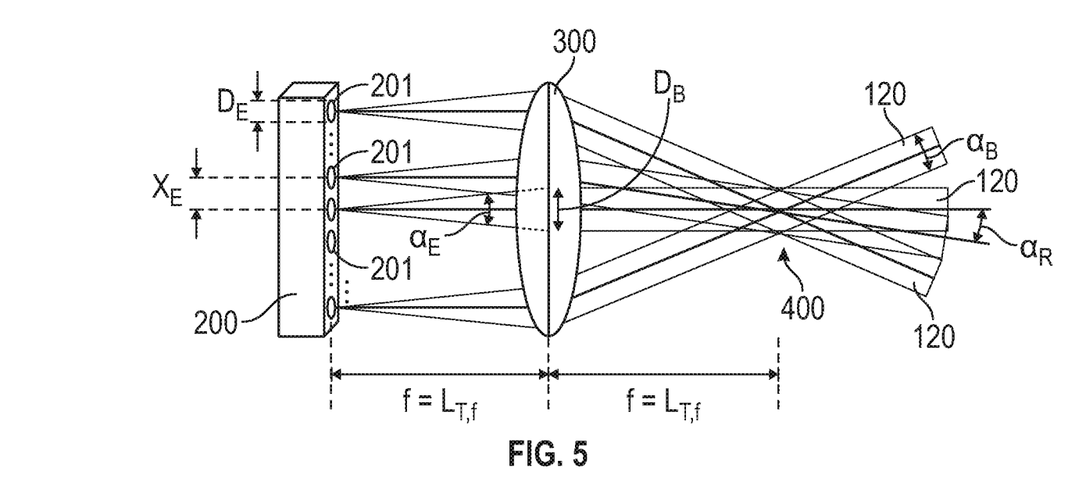
FIG. 5 illustrates a schematic diagram of further details of the portion of the transmitter for the laser-array LIDAR device of FIG. 4 in accordance with certain aspects of the disclosure FIGS. 6A and 6B respectively illustrate schematic side-view and top-view diagrams of a portion of a transmitter for a laser-array LIDAR device in accordance with certain aspects of the disclosure.

FIG. 5 shows a closer view of laser array 200 and lens 300 in the configuration of FIG. 4 in which additional details of the configuration can be seen. In particular, the pitch $X_E$, of lasers 201, the full divergence angle $\alpha_E$, the emitter diameter $D_E$ of each laser 201, the full divergence angle $\alpha_B$ of each emitter, the beamlet diameter $D_B$ at the location of the lens, and the angular resolution $\alpha_R$ are shown. In FIG. 5, the focal length f of lens 300 has been labeled $L_{T,f}$. The lens focal length f ($L_{T,f}$) defines the mapping of the laser array dimensions into angular space.

In the arrangement of FIG. 5, the beamlet angular separation (angular resolution), $\alpha_R$, can be defined as $\alpha_R = \tan^{-1}(X_E/L_{T,f})$. The beamlet full divergence angle, $\alpha_B$, can be approximately defined as $\alpha_B \sim \alpha_R \, D_E/X_E$. The near-field beamlet diameter, $D_B$, at the location of the lens can be defined by $D_B = 2 \, L_{T,f} \tan(\alpha_E/2) + D_E$.

In one example, $\alpha_R = 0.15$ deg and $X_E = 300$ μm, in which case $L_{T,f} = 115$ mm. For $L_{T,f}$ of 115 mm and $D_B = 1.5$ cm, the emitter full divergence angle, $\alpha_E \sim 7.5$ deg.

Figure 6A:
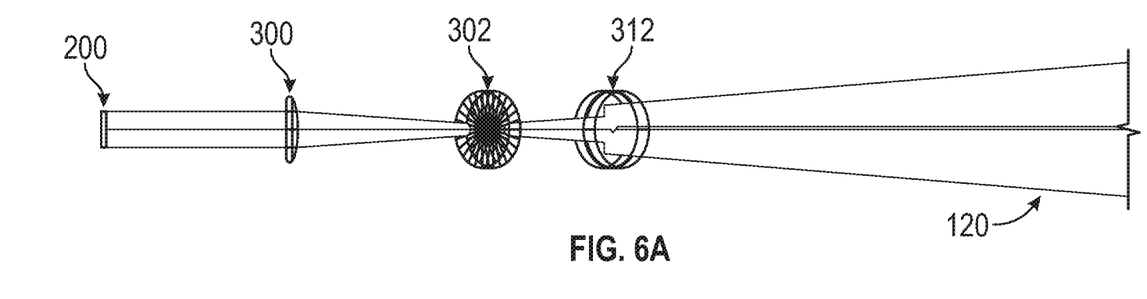
Figure 6B:
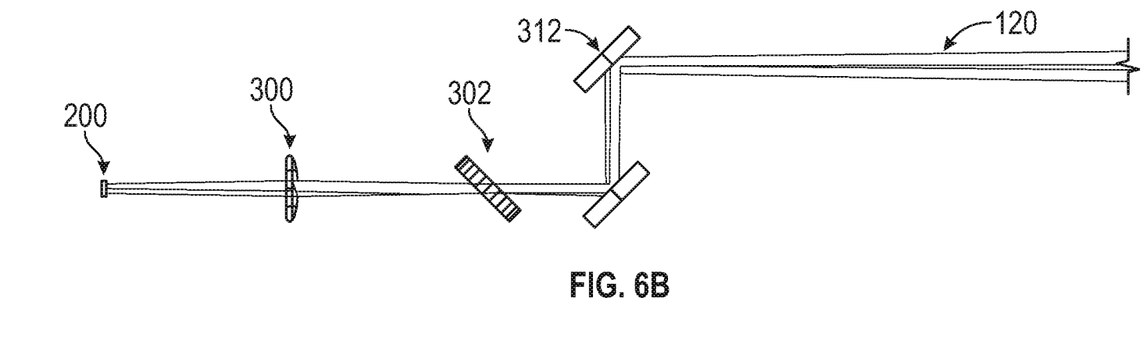

FIGS. 6A and 6B respectively show side and top views of an exemplary optical system for laser-array LIDAR device 102. In the example of FIGS. 6A and 6B, array 200 is a linear array that has an extended dimension as seen in the side view of FIG. 6A. As will be described in further detail, the lasers in the array are linearly distributed along the extended dimension. In the example of FIGS. 6A and 6B, the transmitter portion of device 102 includes two fold-and-scan mirrors 312 disposed on an opposite side of combiner 302 from lens 300.

Figure 7:
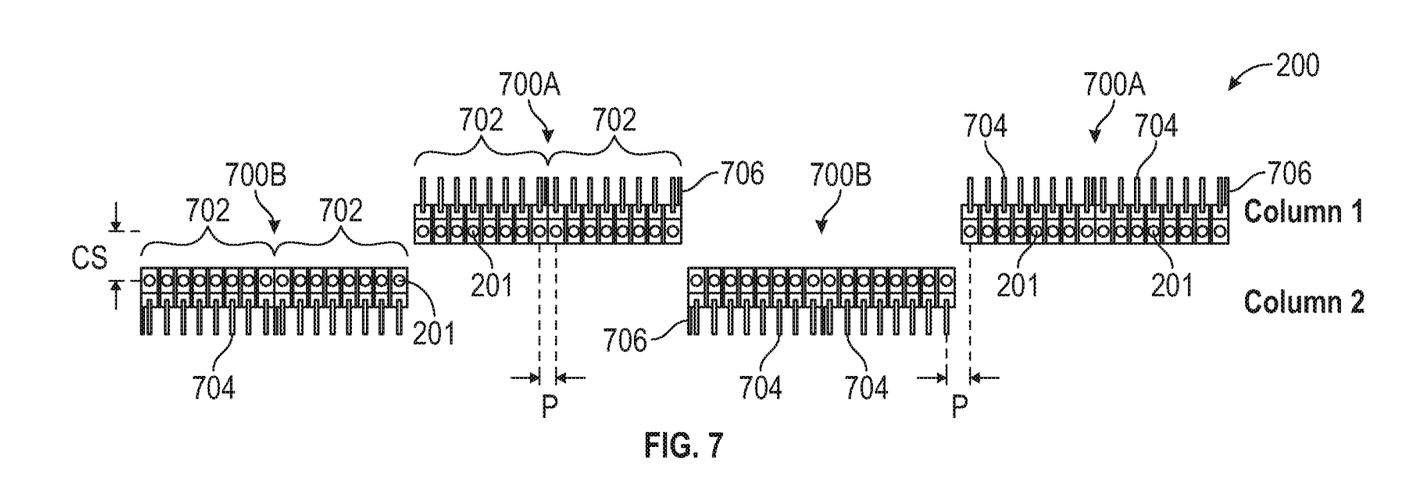
FIG. 7 illustrates a schematic diagram of a laser array for a laser-array LIDAR device in accordance with certain aspects of the disclosure.

FIG. 7 shows an exemplary arrangement of the lasers 201 of laser array 200. As shown in FIG. 7, laser array 200 may include sub-arrays such as sub-arrays 702. In the example of FIG. 7, array 200 includes eight sub-arrays 702, each having an extended dimension in which eight linearly separated lasers 201 are provided. Sub-arrays 702 each include multiple (e.g., eight) linearly separated lasers 201 formed (e.g., lithographically grown) on a common substrate. Other numbers of sub-arrays and/or other numbers of lasers on each sub-array are contemplated.

In the example of FIG. 7, the eight sub-arrays 702 are arranged in four pairs of sub-arrays, each pair coupled end-to-end and extending along a common line (i.e., the lasers of the two sub-arrays in each pair are disposed along a common line). In the example of FIG. 7, two pairs 700A of sub-arrays 702 are spatially separated and extend in a first column along the same common line and another two pairs 700B are also spatially separated and extend in a second column along the another same common line. The common line of pairs 700A in the first column is separated from the common line of pairs 700B in the second column by a separation distance CS in a direction perpendicular to both common lines. Distance CS may be, for example, between 2 mm and 6 mm.

Figure 8:
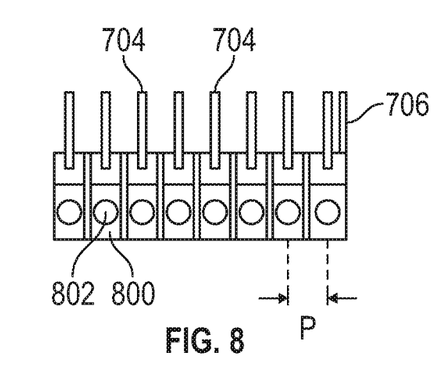
FIG. 8 illustrates a schematic diagram of a sub-array of the laser array of FIG. 7 in accordance with certain aspects of the disclosure.

FIG. 8 shows a more detailed view of one of the sub-arrays 700 of FIG. 7. Lasers 201 of each sub-array may be individually addressable and/or may be operable as a group. For example, using individual first contacts 704 for each laser 201 and a common second contact 706 for all of the lasers of a sub-array may be provided as shown in FIGS. 7 and 8. Individual contacts 704 may be individual anode contacts or individual cathode contacts for each laser. Contacts 706 may be common cathode contacts or common anode contacts for multiple lasers 201.

Some or all of the lasers 201 of one sub-array may be operated as a group with one or more lasers 201 of another sub-array. Lasers 201 on each sub-array may have a pitch of, for example, between 100 microns and 500 microns. As indicated, the pitch between lasers of different groups 700A and 700B and between lasers of different sub-arrays in each pair may be the same as the pitch of the lasers in each sub-array.

Lasers 201 may be vertical-cavity surface-emitting lasers (VCSELs). For example, lasers 201 may be high peak power VCSELs (e.g., providing a peak power of between 25-30 W), with a pulse energy of, for example, greater than 200 nanoJoules achievable with a pulse having a duration of less than 10 nanoseconds (ns) and a sub-ns risetime. Circuitry for operating arrays of VCSELs with these exemplary operational characteristics is described in further detail hereinafter. However, it should be appreciated other types of lasers as described herein may be used for lasers 201.

In the example of FIGS. 7 and 8, laser array 200 includes sixty-four separately addressable high power VCSELs 201 that support multiple pulse formats. In this example, each VCSEL 201 may include emitter structures 802 that have been lithographically grown on a substrate 800.

In this example, array 200 includes eight, 8-VCSEL sub-arrays 702 configured in two columns as shown in FIG. 7. Providing eight VCSELs per sub-array 702 helps support multiplexing of the corresponding receivers 203 and may also reduce loss risks during VCSEL array fabrication. As previously noted, the VCSEL pitch in each sub-array and the optics of the device are arranged to match the angular resolution of the VCSELS to the angular resolution of receivers 203 for a one-to-one VCSEL to receiver correspondence. In the example in which the pitch, P, of sub-arrays 702 (and between VCSELs of neighboring sub-arrays) is 300 microns, array 200 may have a column height of 19.2 mm.

Figure 9A:
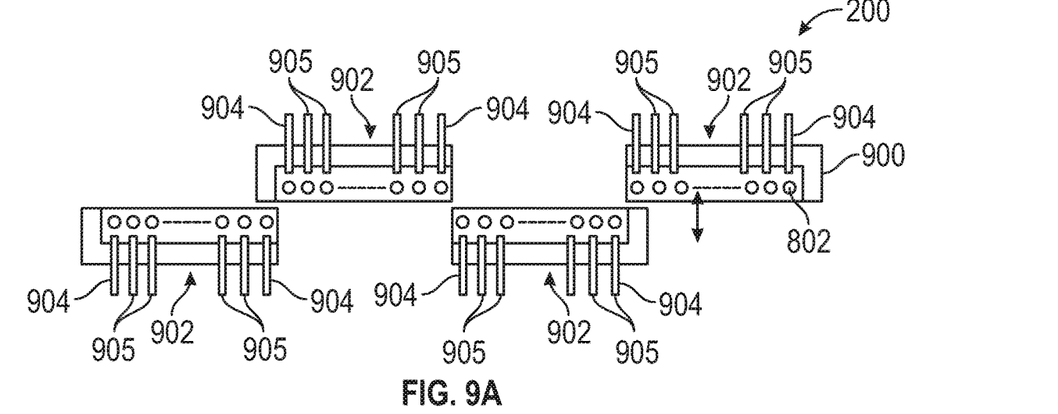
FIGS. 9A and 9B illustrate schematic diagrams of other implementations of laser arrays for a laser-array LIDAR device in accordance with certain aspects of the disclosure.
Figure 9B:
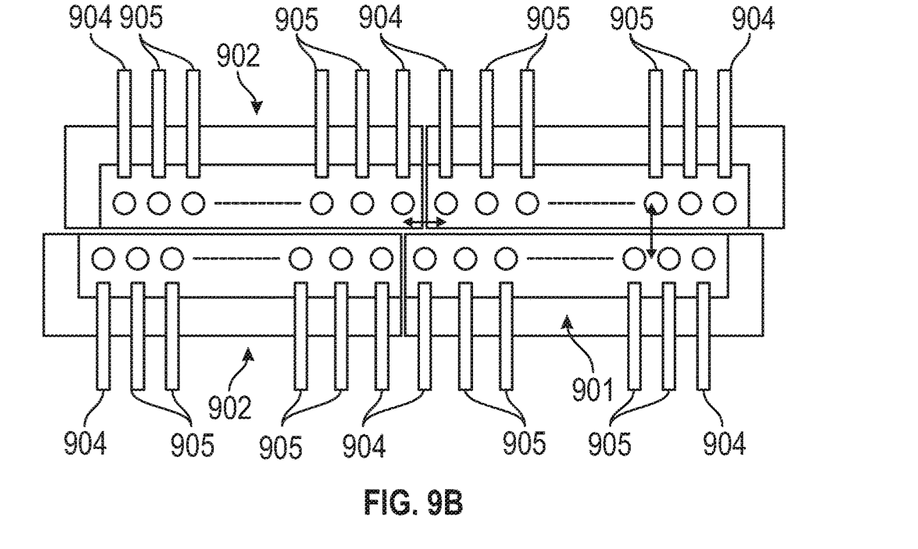

FIGS. 9A and 9B show other examples of arrangements for lasers 201 of array 200. In the example of FIG. 9A, array 200 includes two columns of sub-arrays 902 that are staggered and offset as in the example of FIG. 7, but with sixteen lasers 201 in each subarray. The sixteen lasers 201 on each sub-array may each include sixteen emitting elements 802 on a common substrate 900. Contacts 904 may be individual and/or common contacts for one or more of the lasers 201 in each sub-array 902. For example, the VCSELs in each sub-array 902 may be individually addressable using individual contacts 905 for each receiver and/or may have one or more common contacts 904 (e.g., a common cathode or a common anode for some of the VCSELs in one or more subarrays). In this way, VCSELs 201 can be operated without simultaneously firing adjacent VCSELs, to avoid cross-talk, if desired.

FIG. 9B shows yet another arrangement for array 200 in which four staggered sub-arrays 902 are provided, each with sixteen pixels (e.g., on 400 micron centers in each sub-array and alternating pixels between columns on 200 micron centers). In the example of FIG. 9B, the spacing between sub-arrays 902 in each column has been reduced or eliminated in comparison with the sub-arrays 902 of FIG. 9A.

As previously noted, the array layout for array 200, including the ratio of laser pitch in the array to the array axes separation, is the same as that of the receiver array (e.g., to map transmitter and receiver pixels in the far field).

Figure 10:
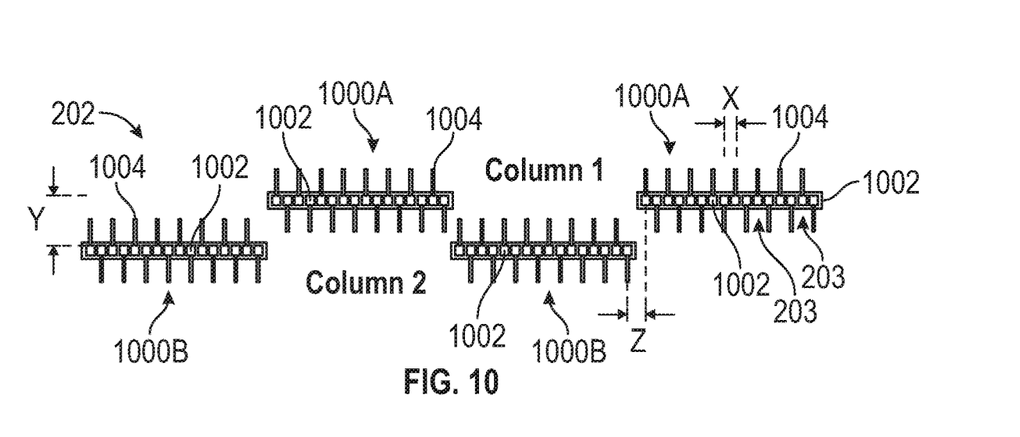
FIG. 10 illustrates a schematic diagram of a receiver array for a laser-array LIDAR device in accordance with certain aspects of the disclosure.

FIG. 10 shows an example of a receiver array 202 with a receiver array pixel configuration that is mapped to the VCSEL array configuration of the examples of FIG. 7 or FIG. 9. As shown in FIG. 10, receiver array 202 may include four, sixteen-pixel receiver sub-arrays 1002 with receiver pixels mapped to same angle space as the transmitter VCSEL sub-arrays 702 of FIG. 7 or 902 of FIG. 9.

In the example of FIG. 10, a pair 1000A of sub-arrays 1002 is spatially separated and extend in a first column along the same common line and another pair 1000B is also spatially separated and extend in a second column along the another same common line. The common line of pairs 1000A in the first column is separated from the common line of pairs 1000B in the second column by a separation distance Y in a direction perpendicular to both common lines. Readout and/or control contacts 1004 are provided (e.g., for each receiver pixel 203). In other example, in correspondence with the arrangement of lasers 201 in FIG. 7, eight sub-arrays 1002, each having eight receivers 203, are arranged in four pairs of sub-arrays, each pair coupled end-to-end and extending along a common line (i.e., the receivers of the two sub-arrays in each pair are disposed along a common line).

The ratio of receiver pixel pitch X to the linear array column separation Y is the same equivalent ratio for the transmitter VCSEL pitch to VCSEL array column spacing (e.g., the ratio of P to CS in FIG. 7). In the example, of FIG. 10, the pixel pitch X is the same as the pixel offset Z between sub-arrays.

Figure 11:
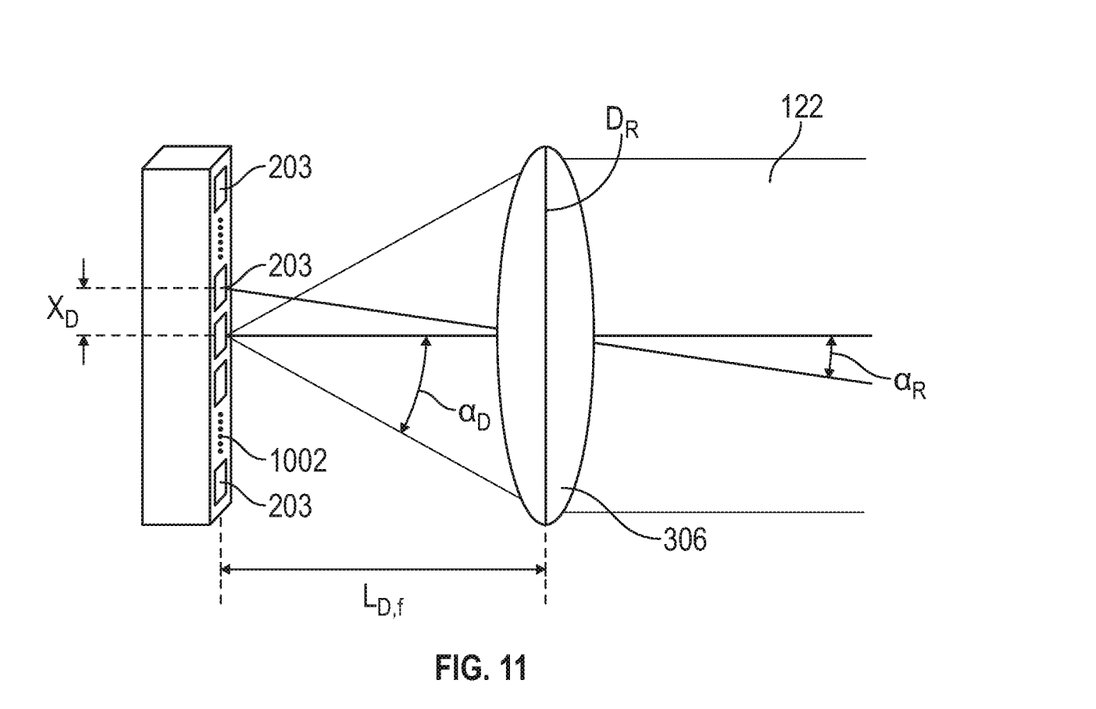
FIG. 11 illustrates a schematic diagram of a sub-array of the receiver array of FIG. 10 in accordance with certain aspects of the disclosure.
Figure 12:
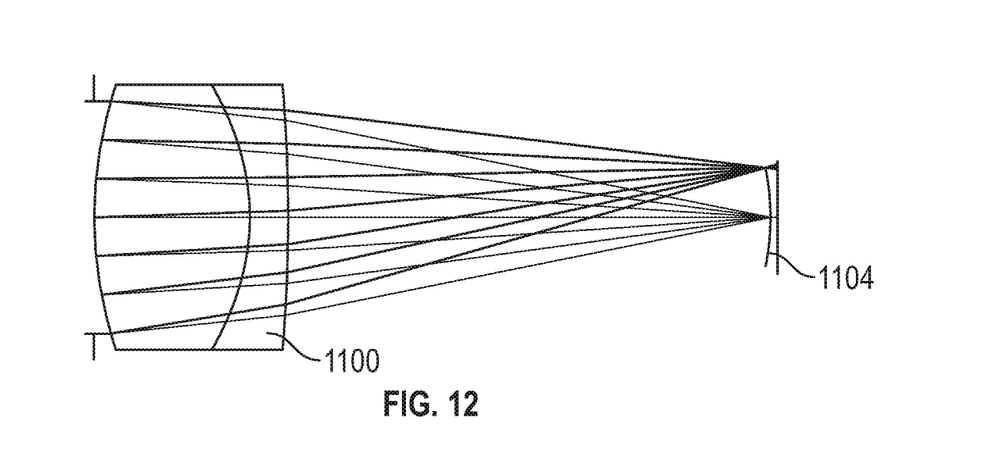
FIG. 12 illustrates a ray trace diagram of receiver portion of a laser-array LIDAR device in accordance with certain aspects of the disclosure.

FIG. 11 shows details of the angular resolution, $\alpha_R$, of an exemplary sub-array 1002 of receivers 203. The angular resolution, $\alpha_R$, of sub-array 1002 is defined by the transmitter and receiver array pitch and transmitter and receiver lens focal lengths. In the example of FIG. 11, receiver lens 306 has a clear diameter, $D_R$, and a focal length, $L_{D,f}$. In this example, the detector angle is $\alpha_D$, the receiver pixel pitch is $X_D$, and the angular resolution, $\alpha_R$, is $\alpha_R = \tan^{-1}(X_D/L_{D,f})$ In the example of FIG. 11, receivers 203 are spaced apart on a planar substrate. However, as shown in FIG. 12, in some implementations, a defocused/curved image plane 1104 (e.g., generated by a plano-concave receiver lens 1100) may be provided. A defocused/curved image plane 1104 can be used in some implementations (e.g., in a implementation with fiber couplings to receivers 203), or a planar image plane can be generated using one or more field-flattening optical elements (e.g., for use with a planar or linear array of receivers 203).

Figure 13:
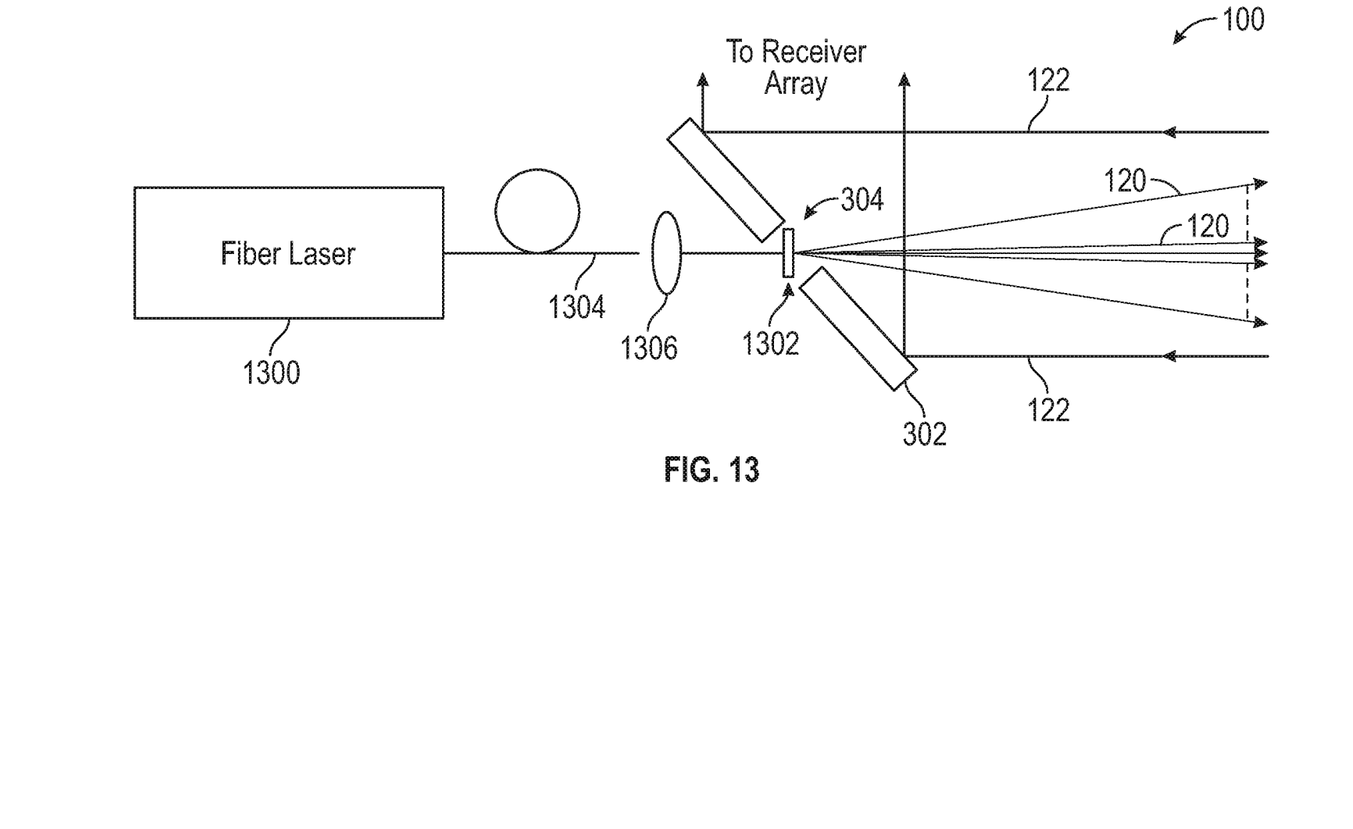
FIG. 13 illustrates a schematic diagram of a portion of a fiber-laser transmitter for a laser-array LIDAR device in accordance with certain aspects of the disclosure.

Examples have been described in which array 200 is an array of VCSELs. However, as noted herein, in some implementations, beamlets 120 may be generated by one or more fiber lasers. FIG. 13 shows an example implementation of a laser-array LIDAR device implemented with a fiber laser.

As shown in FIG. 13, system 100 may be implemented with a fiber laser such as fiber laser 1300 having fiber 1304 that provides a laser beam to lens 1306 and diffractive element 1302. Diffractive element 1302 may be, for example, a 1×N diffractive beam splitter that generates a desired pattern of N beamlets 120 in angle space. As with the distribution of VCSELs in the examples of FIGS. 7-9B, the beamlets 120 generated by fiber laser 1300 and diffractive element 1302 have an angular distribution that corresponds to the spatial distribution of receivers 203 that receive reflected portions 122 of beamlets 120. Fiber laser 1300 may, for example, be a near diffraction-limited (e.g., $M^2<1.5$) 4 ns pulsed fiber laser source for single channel illumination to generate one or more beams with a free space beam divergence half angle of, for example, 0.37 mrad or 0.021 deg.

Diffractive element 1302 may be, for example, a 17-spot diffractive element (zeroth order plus+/−8 diffraction orders) coupled to a single collimated input beam from fiber laser 1300. In another example, diffractive element 1302 may include one or more 9-spot diffractive elements (zeroth order plus+/−4 orders) that receive a collimated input beam from fiber laser 1300 split into two adjacent beams angle-separated vertically using free space optics.

Although the example of FIG. 13 shows a fiber laser arrangement in which beamlets 120 are generated by a diffractive element, it should also be appreciated that a fiber bundle and lenslet array may be used to generate beamlets 120 from fiber laser source 1300, without the use of diffractive element 1302.

For example, lasers 201 of FIGS. 7, 8, 9A and/or 9B may each be implemented as a fiber-fed laser emitter that generates a beamlet to be collimated and steered by lens 300. For example, the output of fiber laser 1300 may be split using single mode fiber splitters into, for example, sixteen power-matched channels.

In order to generate pulsed laser beamlets with the speed and intensity desired for LIDAR applications with a laser-array LIDAR device, high speed electronic circuits that generate high peak current are desirable. However, challenges can arise when attempting to provide the desired high speed electronic circuits with the desired high peak currents, particularly in small scale devices such as lithographic arrays.

In accordance with various aspects of the subject disclosure drive circuit 308 is provided with various features that help manage the electrical inductance therein. As described in further detail hereinafter, drive circuit 308 may include a unique use of an isolated gate driver to better control ground loops and a field-effect-transistor (FET) with a separate source for gate drive. The separate source helps reduce the effect of high currents through the source inductance.

Figure 14:
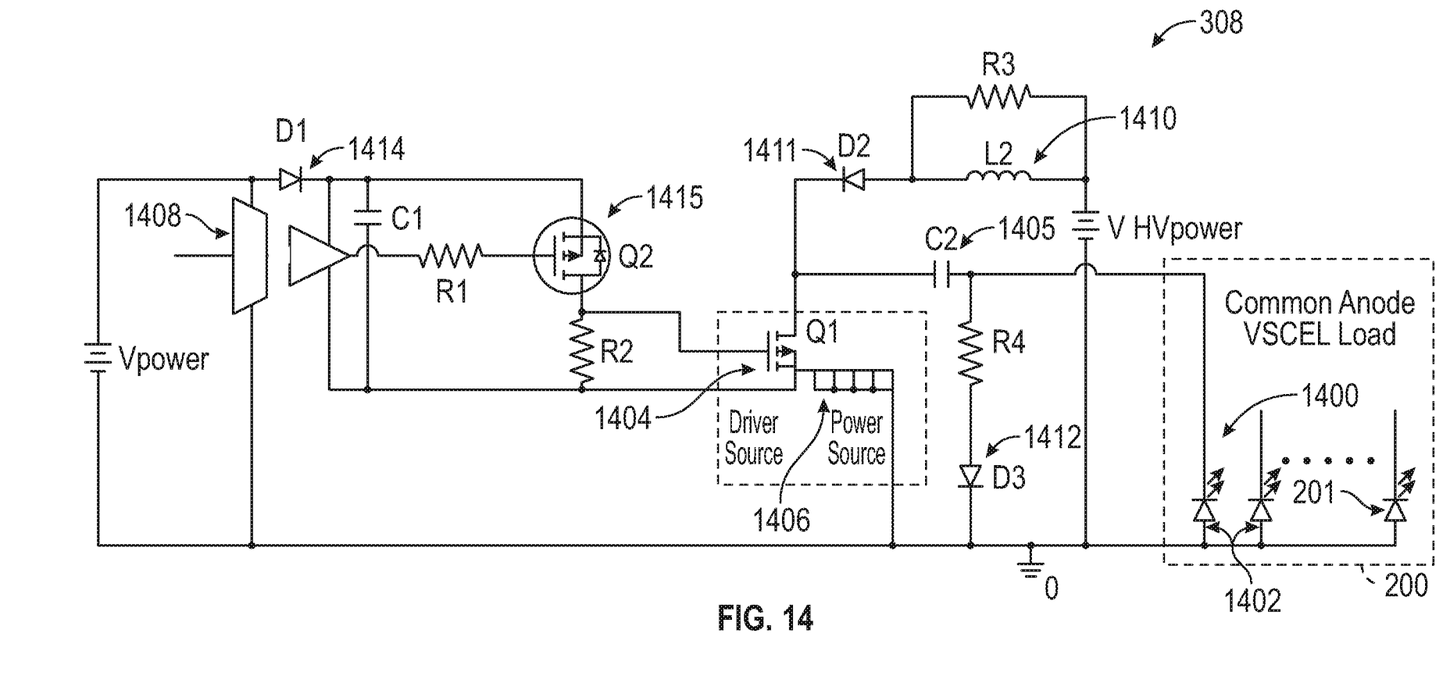
FIG. 14 illustrates a schematic view of a transmitter drive circuit for a laser-array LIDAR device in accordance with certain aspects of the disclosure.

FIG. 14 shows a first example of driver circuitry for drive circuit 308 in which an isolated gate driver and a separately sourced FET are provided. In the example of FIG. 14, drive circuit 308 is a common anode driver in which anode contacts 1402 of multiple lasers 201 are coupled together and the cathode contacts 1400 are separately driven for at least some of lasers 201.

As shown in FIG. 14, drive circuit 308 may include drive transistor 1404 having a gate terminal coupled to isolated gate driver 1408 (e.g., via transistor 1415) and a source terminal coupled to a separate power source 1406. The drain terminal of transistor 1404 is coupled, via capacitor 1405, to the cathode 1400 of at least one laser 201.

The drain terminal of transistor 1404 is also coupled to diode 1411 and inductor 1410, which are coupled in series with each other and in parallel with capacitor 1405. In this configuration, transistor 1404 has a separate source connection for the gate drive, allowing faster turn-on discharging of capacitor 1405 into one or more lasers 201. In this configuration, isolated driver 1408 provides a gate drive for transistor 1404 that reduces any effects of, for example, ground bounce.

As shown in FIG. 14, diode 1414 may be coupled to a secondary side of isolated driver 1408. Diode 1414 recharges driver 1408 secondary side power while providing an idle bias current for the diode load. In the configuration of FIG. 14, inductor 1410, diode 1412 and transistor 1404 also provide a flyback voltage, doubling the voltage recharging of capacitor 1405 for a subsequent pulse.

Figure 15:
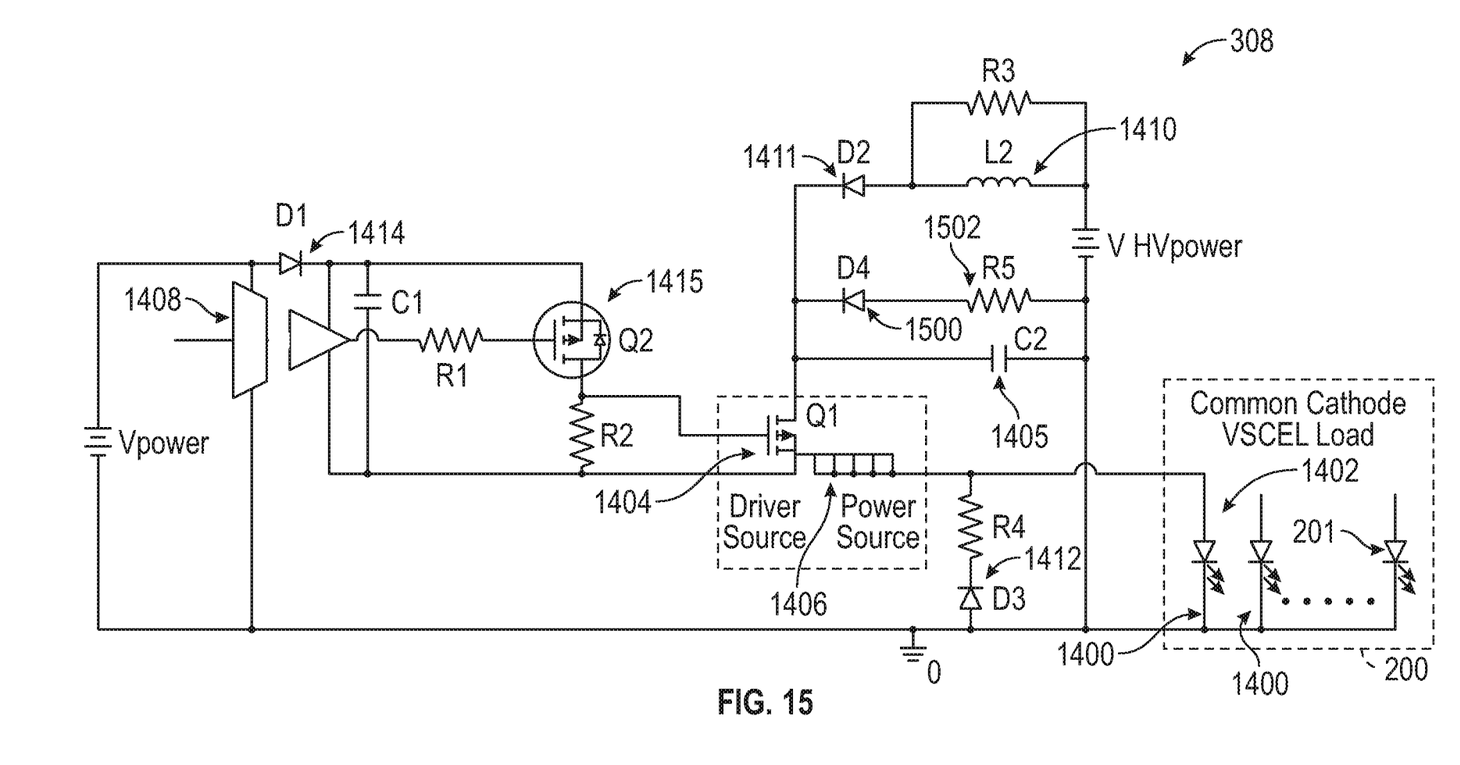
FIG. 15 illustrates a schematic view of another transmitter drive circuit for a laser-array LIDAR device in accordance with certain aspects of the disclosure.

Although the example of FIG. 14 shows a common anode arrangement for drive circuit 308, the benefits described above of isolated driver 1408 and separate source 1406 can also be provided in a common cathode arrangement, if desired. FIG. 15 shows a common cathode arrangement for drive circuit 308 in which cathode contacts 1400 of multiple lasers 201 are coupled together, and the drain terminal of transistor 1404 is coupled, via capacitor 1405, to the anode contact 1402 of at least one laser 201.

As shown in FIG. 15, in order to provide the benefits described above in connection with FIG. 14 in a common cathode arrangement, drive circuit 308 may be provided with series-coupled diode 1500 and resistor 1502, coupled in parallel with capacitor 1405 and in parallel with series-coupled diode 1411 and inductor 1410.

In the examples of FIGS. 14 and 15, the driver circuitry shown is configured to drive a single laser 201. However, in various arrangements, two or more lasers 201 can be driven by a single driver circuit such as the driver circuit of FIG. 14 or the driver circuit of FIG. 15. In one suitable example, drive circuit 308 includes eight drivers that each fire eight lasers (e.g., VCSELs) at the same time (e.g., for a sixty-four VCSEL array such as array 200 of FIG. 7). In order to reduce crosstalk, the eight driver circuits can be coupled to lasers 201 in an interleaved fashion (e.g., each driver circuit can be coupled to every fourth laser 201 in the array, including lasers in separate sub-arrays).

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these aspects will be readily apparent to those skilled in the art, and generic principles defined herein may be applied to other aspects. Thus, many changes and modifications may be made to the subject technology, by one having ordinary skill in the art, without departing from the scope of the subject technology.

It is understood that the specific order or hierarchy of steps in the processes disclosed is an illustration of exemplifying approaches. Based upon design preferences, it is understood that the specific order or hierarchy of steps in the processes may be rearranged. Some of the steps may be performed simultaneously.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

A reference to an element in the singular is not intended to mean "one and only one" unless specifically stated, but rather "one or more". The term "some" refers to one or more. Underlined and/or italicized headings and subheadings are used for convenience only, do not limit the subject technology, and are not referred to in connection with the interpretation of the description of the subject technology. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for". Furthermore, to the extent that the term "include", "have", or the like is used in the description or the claims, such term is intended to be inclusive in a manner similar to the term "comprise" as "comprise" is interpreted when employed as a transitional word in a claim.

What is claimed is:

1. A ranging device, comprising:
a plurality of arrays of lasers arranged along a first column and a second column, wherein a first pair of sub-arrays of the plurality of arrays of lasers is coupled end-to-end along a common line along the first column and is spatially separated from a remainder of arrays of lasers arranged along the first column and a second pair of sub-arrays of the plurality of arrays of lasers is coupled end-to-end along a common line along the second column and is spatially separated from a remainder of arrays of lasers arranged along the second column;

a plurality of arrays of corresponding receivers arranged along a third column and a fourth column, wherein a ratio of laser pitch in the plurality of arrays of lasers to a separation between the first column and the second column is equal to a ratio of receiver pitch in the plurality of arrays of corresponding receivers to a separation between the third column and the fourth column;

a combiner configured to redirect light that has been generated by the plurality of arrays of lasers and reflected from a target to the array of corresponding receivers;

a lens interposed between the plurality of arrays of lasers and the combiner and configured to focus the light that has been generated by the plurality of arrays of lasers onto the combiner; and an additional lens configured to focus collimated light that has been reflected from the target and redirected by the combiner as parallel light paths, onto the plurality of arrays of corresponding receivers, wherein the combiner comprises a transmit-and-receive combiner positioned at a focus location of the lens.

2. The ranging device of claim 1, wherein the combiner comprises an opening, and wherein the lens is configured to collimate a beamlet generated by one of the lasers and to direct the collimated beamlet through the opening in the combiner.

3. The ranging device of claim 2, wherein the lens is configured to collimate beamlets generated by all of the lasers and to direct all of the collimated beamlets through the opening in the combiner.

4. The ranging device of claim 1, further comprising a scanning mirror that is rotatable to scan an array of beamlets from the plurality of arrays of lasers over at least a portion of the target.

5. The ranging device of claim 1, wherein the collimated light that has been reflected from the target and redirected by the combiner includes a plurality of portions, each generated by one of the lasers, and wherein the additional lens is configured to focus the portion generated by each of the lasers onto a corresponding one of the corresponding receivers.

6. The ranging device of claim 1, wherein the light that has been generated by the plurality of arrays of lasers comprises an array of beamlets each corresponding to an angular resolution of a corresponding one of the arrays of corresponding receivers.

7. The ranging device of claim 1, wherein each of the lasers is a vertical-cavity surface-emitting laser.

8. The ranging device of claim 7, wherein the plurality of arrays of lasers comprises at least one sub-array including a plurality of the vertical-cavity surface-emitting lasers on a common transmitter substrate.

9. The ranging device of claim 8, wherein the plurality of arrays of corresponding receivers comprises at least one sub-array that includes a plurality of avalanche photodiodes on a common receiver substrate.

10. The ranging device of claim 9, wherein the plurality of the vertical-cavity surface-emitting lasers on the common transmitter substrate have a matched angular resolution with the plurality of avalanche photodiodes on the common receiver substrate.

11. The ranging device of claim 1, wherein at least one of the lasers is a fiber laser or an edge-emitting laser.

12. The ranging device of claim 1, wherein the light that has been generated by the plurality of arrays of lasers comprises an array of beamlets, each generated by one of the lasers, wherein the array of beamlets has a fill factor, and wherein the fill factor is maintained above 0.5 by at least one of: a physical fill factor of the array of lasers, and an array of microlenses that is lithographically matched to the array of lasers.

13. A device, comprising:

a plurality of arrays of lasers arranged along a first column and a second column, each laser configured to generate a beamlet of an angularly continuous beam, wherein a first pair of sub-arrays of the plurality of arrays of lasers is coupled end-to-end along a common line along the first column and is spatially separated from a remainder of arrays of lasers arranged along the first column and a second pair of sub-arrays of the plurality of arrays of lasers is coupled end-to-end along a common line along the second column and is spatially separated from a remainder of arrays of lasers arranged along the second column;

a plurality of arrays of receivers arranged along a third column and a fourth column, each receiver having a field of view corresponding to the beamlet of one of the lasers, wherein a ratio of laser pitch in the plurality of arrays of lasers to a separation between the first column and the second column is equal to a ratio of receiver pitch in the plurality of arrays of corresponding receivers to a separation between the third column and the fourth column;

a lens interposed between the plurality of arrays of lasers and a combiner and configured to focus the light that has been generated by the plurality of arrays of lasers onto the combiner; and an additional lens configured to focus collimated light that has been reflected from the target and redirected by the combiner as parallel light paths, onto the plurality of arrays of receivers, wherein the combiner comprises a transmit-and-receive combiner positioned at a focus location of the lens.

14. The device of claim 13, wherein each beamlet at least partially overlaps at least one other beamlet.

15. The device of claim 13, wherein the plurality of arrays of lasers comprises a plurality of sub-arrays, each including a plurality of linearly distributed lasers on a common substrate.

16. The device of claim 15, wherein the plurality of arrays of receivers comprises a plurality of sub-arrays, each including a plurality of linearly distributed receivers on a common substrate, wherein the plurality of linearly distributed receivers have a one-to-one correspondence with the plurality of linearly distributed lasers.

17. The device of claim 15, wherein the plurality of sub-arrays includes a first pair of sub-arrays aligned along a common first line and a second pair of sub-arrays aligned along a common second line, the common first line parallel to and separated from the common second line.

* * * * *